US011865841B2

(12) United States Patent
Bonjoch Roma et al.

(10) Patent No.: US 11,865,841 B2
(45) Date of Patent: Jan. 9, 2024

(54) SPITTOON ASSEMBLY FOR A PRINTING DEVICE

(71) Applicant: Hewlett-Packard Development Company, L.P., Spring, TX (US)

(72) Inventors: Ignasi Bonjoch Roma, Sant Cugat del Valles (ES); Andreu Vinets Alonso, Sant Cugat del Valles (ES); Javier Deocon Mir, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 46 days.

(21) Appl. No.: 17/417,250

(22) PCT Filed: Apr. 12, 2019

(86) PCT No.: PCT/US2019/027287

§ 371 (c)(1),
(2) Date: Jun. 22, 2021

(87) PCT Pub. No.: WO2020/209870

PCT Pub. Date: Oct. 15, 2020

(65) Prior Publication Data

US 2022/0072860 A1 Mar. 10, 2022

(51) Int. Cl.
*B41J 2/165* (2006.01)
*B41J 2/17* (2006.01)

(52) U.S. Cl.
CPC ......... *B41J 2/16523* (2013.01); *B41J 2/1721* (2013.01); *B41J 2/16505* (2013.01); *B41J 2/16547* (2013.01); *B41J 2002/1742* (2013.01)

(58) Field of Classification Search
CPC .. B41J 2/16523; B41J 2/1721; B41J 2/16505; B41J 2/16547; B41J 2002/1742
See application file for complete search history.

(56) References Cited

U.S. PATENT DOCUMENTS

| | | | | |
|---|---|---|---|---|
| 4,577,203 | A | 3/1986 | Kawamura | |
| 5,774,139 | A | 6/1998 | Salzer et al. | |
| 5,997,128 | A | 12/1999 | Lou et al. | |
| 6,203,135 | B1 | 3/2001 | Murcia et al. | |
| 6,577,774 | B1 | 6/2003 | Asada | |
| 6,695,431 | B2 | 2/2004 | Kumagai | |
| 6,783,221 | B2 | 8/2004 | Phillips | |
| 6,857,721 | B2 * | 2/2005 | Salzer | B41J 2/16508 347/36 |
| 7,905,571 | B2 | 3/2011 | Byun | |
| 8,147,049 | B2 | 4/2012 | Korol et al. | |

(Continued)

FOREIGN PATENT DOCUMENTS

| | | | |
|---|---|---|---|
| GB | 234765 | A | 11/1998 |
| WO | WO-2016198083 | A1 | 12/2016 |

*Primary Examiner* — Geoffrey S Mruk

(57) ABSTRACT

Disclosed herein is a spittoon assembly for a printing device, a printing device comprising a spittoon assembly, and a method of cleaning a print head using a spittoon assembly. The spittoon assembly comprises a waste receptacle and a spit plate with a receiving surface. The receiving surface is inclined relative to a horizontal direction by an inclination angle when the spittoon assembly is mounted in the printing device. A fluid path extends from the receiving surface to the waste receptacle.

5 Claims, 9 Drawing Sheets

(56) References Cited

U.S. PATENT DOCUMENTS

| | | | | |
|---|---|---|---|---|
| 8,371,677 | B2 * | 2/2013 | Fukasawa | B41J 2/1721 347/35 |
| 8,388,102 | B2 | 3/2013 | Urbistondo et al. | |
| 8,641,178 | B1 | 2/2014 | Snyder et al. | |

* cited by examiner

SPITTOON ASSEMBLY FOR A PRINTING DEVICE

BACKGROUND

Printing devices like ink-jet printers may be cleaned regularly to maintain image quality and to prevent partial or complete clogging of print head nozzles. To this end, printing devices can comprise a maintenance subsystem to perform servicing operations on a print head of the printing device.

BRIEF DESCRIPTION OF DRAWINGS

In the following, a detailed description of various examples is given with reference to the figures. The figures show schematic illustrations of FIG. 1: a spittoon assembly for a printing device according to an example.

DETAILED DESCRIPTION

Servicing operations performed on a print head of a printing device may include ejecting print fluid from nozzles of the print head to prevent clogging of the nozzles. The printing device may comprise a spittoon assembly for collecting the print fluid ejected from the nozzles. The spittoon assembly may have a waste receptacle to receive the ejected print fluid and may comprise means to transfer the ejected print fluid into the waste receptacle.

Figure 1:
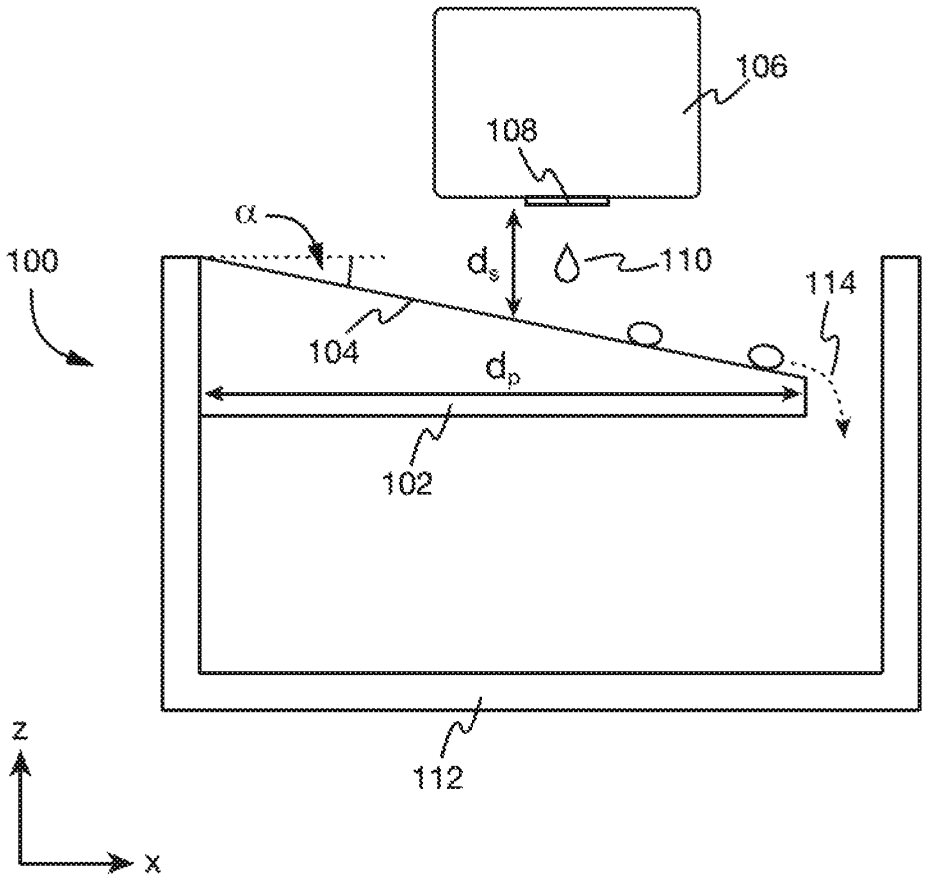

FIG. 1 depicts a spittoon assembly 100 for a printing device (not shown) in accordance with an example. The spittoon assembly 100 comprises a spit plate 102 with a receiving surface 104. When the spittoon assembly 100 is mounted in the printing device, the receiving surface 104 is inclined relative to a horizontal direction by an inclination angle α. In some examples, the receiving surface 104 may be inclined relative to a scanning direction of a print head 106 of the printing device, i.e. the receiving surface 104 may exhibit the largest slope along the scanning direction. The scanning direction of the print head 106 may be aligned with the X axis and may also be referred to as the X direction in the following. The horizontal direction is perpendicular to the direction of gravity, which may be aligned with the Z axis and may also be referred to as the Z direction following.

When the spittoon assembly 100 is mounted in the printing device, the receiving surface 104 may be facing the print head 106, in particular a nozzle plate 108 arranged on a bottom surface of the print head 106 as detailed below with reference to FIGS. 3*a* and 3*b*. The nozzle plate 108 may comprise a plurality of nozzles (not shown) that are to deposit a print fluid onto a print medium (not shown), wherein the print fluid may be an ink, for example a dye-sublimation ink or a latex ink.

The receiving surface 104 may be provided to receive print fluid ejected from a nozzle of the print head 106, e.g. a jet or drop 110 of print fluid ejected from the nozzle. The inclination angle α may be chosen such that print fluid deposited on the receiving surface 104 flows downwards towards a lower end of the receiving surface 104. A larger inclination angle α may facilitate a flow of the print fluid on the receiving surface 104. The ejected print fluid may flow along a fluid path 114 that extends from the receiving surface 104 to the waste receptacle 112. Thereby, the receiving surface 104 may allow for gravity-induced transfer of the ejected print fluid into a waste receptacle 112 without movable or motorized parts such as a spit roller. The spittoon assembly 100 may thus be easier to manufacture and less prone to failure than spittoon assemblies with movable or motorized parts. Furthermore, the capacity of the waste receptacle 112 may be larger than the capacity of foam structures such that the spittoon assembly 100 may be used for longer times without replacement.

The larger the inclination angle α, the larger a spit distance $d_s$ between the nozzle plate 108 and the receiving surface 104 may become, in particular at the lower end of the receiving surface 104. When the spit distance $d_s$ is increased, the drop 110 ejected from the nozzle plate 108 may partially disintegrate and may generate aerosol. The aerosol may contaminate the printing device and may lead to a deterioration of print quality. Printing devices may comprise means for actively extracting aerosol, e.g. comprising a fan. To avoid this, the inclination angle α may be chosen such that the inclination angle α is sufficiently large to allow the print fluid to flow on the receiving surface 104, while at the same time limiting the largest spit distance $d_s$ to reduce the generation of aerosol. The largest spit distance is the distance between the nozzle plate 108 and the receiving surface 104 in the Z direction when the print head 106 is positioned above the lower end of the receiving surface 104, i.e. above the right end in FIG. 1. The smallest spit distance is the distance between the nozzle plate 108 and the receiving surface 104 in the Z direction when the print head 106 is positioned above the upper end of the receiving surface 104, i.e. above the left end in FIG. 1. The spittoon assembly 100 may thus allow for servicing of the print head 106 without the need for aerosol extraction.

The inclination angle α may for example be between 10° and 30°, in some examples between 15° and 25°, e.g. about 20°. A length $d_p$ of the receiving surface 104 in the scanning direction, i.e. along the X axis, may e.g. be between 3 mm and 15 mm, wherein the length $d_p$ along the scanning direction refers to the length of the projection of the receiving surface 104 onto the scanning direction, i.e. the length as seen by the print head 106. The largest spit distance may for example be between 1 mm and 5 mm. The smallest spit distance may e.g. be in the range of 0.5 mm and 2 mm. In some examples, the inclination angle α may vary over the receiving surface 104, i.e. the receiving surface 104 may exhibit a curvature or segments with different inclination angles.

To facilitate the flow of print fluid on the receiving surface 104, the receiving surface 104 may be polished. The receiving surface 104 may have a surface roughness Sa of less than 5 μm, in some examples less than 2 μm, in one example less than 1 μm, wherein the surface roughness Sa denotes the arithmetical mean deviation of the surface profile as defined in ISO 25178. The receiving surface 104 may for example comprise or consist of plastic, in particular plastic comprising polyphenylene ether, e.g. PPO. Furthermore, a contact angle between the receiving surface 104 and water may be more than 45°, in some examples more than 60°, in one example more than 90°, i.e. the receiving surface 104 may be hydrophobic.

Figure 2:
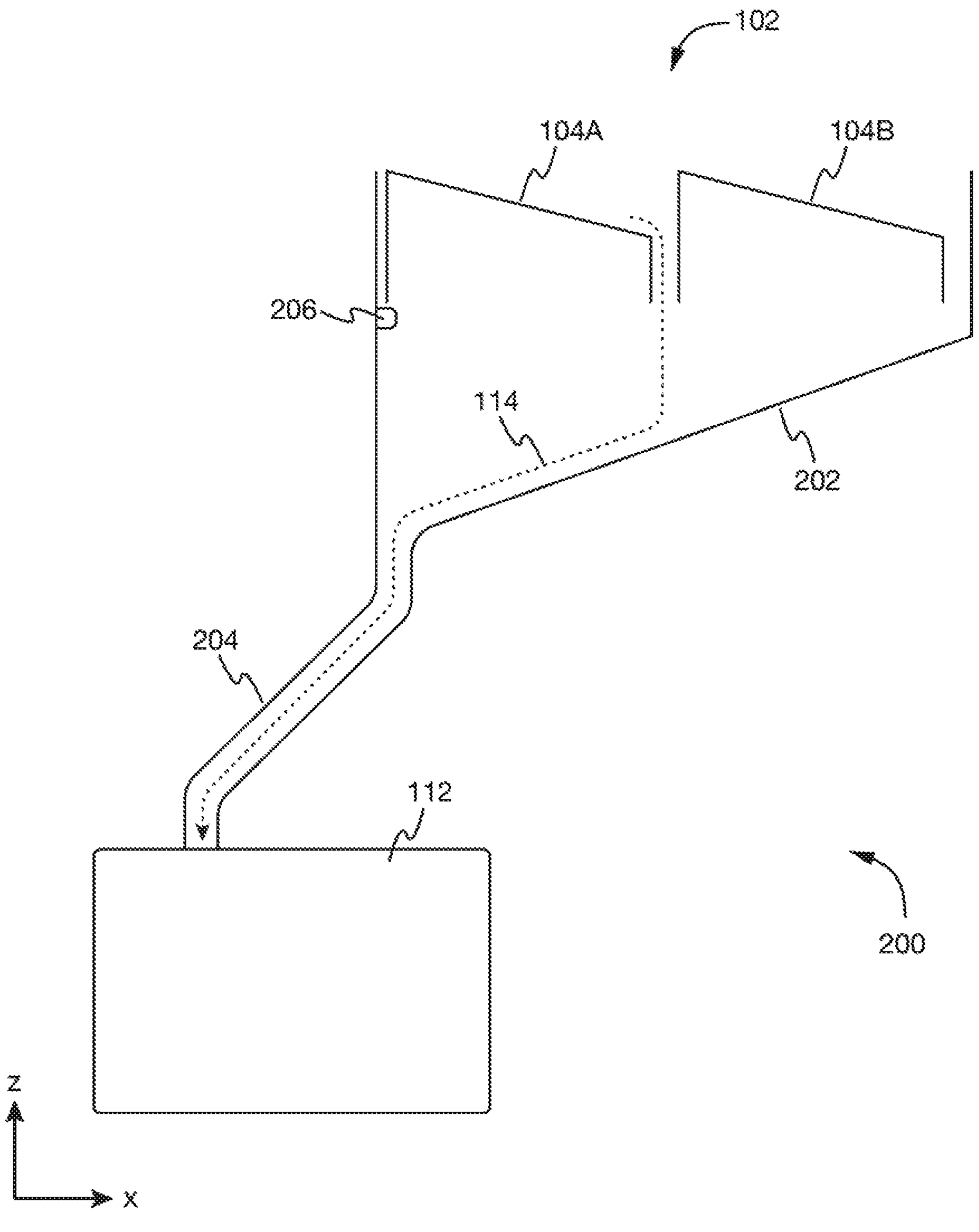
FIG. 2: a spittoon assembly with a segmented spit plate according to an example.

FIG. 2 shows a spittoon assembly 200 with a segmented spit plate 102 according to an example. Similar to the spittoon assembly 100, the spittoon assembly 200 comprises a waste receptacle 112 and a spit plate 102 with a receiving surface 104, wherein the receiving surface 104 is inclined relative to a horizontal direction by an inclination angle when the spittoon assembly 200 is mounted in a printing device (not shown). The receiving surface 104 may comprise a plurality of segments, e.g. two segments 104A and 104B as in the example shown in FIG. 2, each of which is inclined by an inclination angle. The inclination angle may be the same for all segments 104A, 104B or may differ between segments, for example if the segments are to receive different print fluids, e.g. print fluids with different viscosity.

Segmenting the receiving surface 104 may allow for reducing the maximum spit distance without reducing the inclination angle or for increasing the inclination angle and/or the length $d_p$ of the receiving surface 104 without increasing the maximum spit distance. In some examples, the segments 104A, 104B may be provided to receive print fluids from different nozzles of a print head simultaneously, e.g. print fluids of different color. This may reduce the duration of the servicing of the print head.

The spittoon assembly 200 may further comprise a funnel 202 along the fluid path 114. The funnel 202 may be arranged below the spit plate such that a wide opening of the funnel 202 faces towards the receiving surface 104 and a narrow opening of the funnel 202 faces towards the waste receptacle 112. The funnel 202 may collect print fluid flowing from the segments 104A, 104B of the receiving surface 104 and may guide the print fluid towards a tube 204 connecting the funnel 202 with the waste receptacle 112. The tube 204 may in particular consist of or comprise a flexible material, e.g. flexible plastic or rubber. An inner diameter of the tube may for example be between 1 mm and 3 mm, e.g. about 2 mm. In some examples, the waste receptacle 112 may be removably attached to the tube 204, e.g. via a connector with a fastener or thread, such that the waste receptacle 112 can be replaced.

The fluid path 114 may extend from the receiving surface 104, e.g. a lower end of each segment 104A, 104B, to the waste receptacle 112 via the funnel 202 and the tube 204. A minimum slope of the fluid path 114 may be larger than 0.2, in some examples larger than 0.3, in one example larger than 0.4, when the spittoon assembly is mounted in the printing device, e.g. to prevent the print fluid from collecting on a surface of the spittoon assembly 200 along the fluid path 114. The slope of the fluid path 114 is defined as the ratio $\Delta z/\Delta r$, wherein $\Delta z$ is the height difference along the Z axis between two adjacent points on the fluid path 114 and $\Delta r$ is the horizontal distance between the adjacent points in a plane perpendicular to the Z axis. Accordingly, the minimum slope of the fluid path 114 is the smallest value of the slope of the fluid path 114 along the fluid path 114. A positive value of the slope indicates that the fluid path 114 is inclined towards the waste tank 112. A slope of 0.2 approximately corresponds to inclination angle of 11°, a slope of 0.3 to an inclination angle of 17° and a slope of 0.4 to an inclination angle of 22°.

In one example, the spittoon assembly 200 may comprise a plurality of waste receptacles, e.g. to store different printing fluids that may react with each other. Each of the waste receptacles may for example be connected to one of the segments 104A and 104B by a fluid path. The fluid paths may be completely separated from each other, i.e. there may be no connection between the fluid paths, e.g. to prevent the printing fluids from coming in contact with each other. This may e.g. prevent different printing fluids from reacting with each other.

The spit plate 102 may be removably attached to the spittoon assembly 200, e.g. to facilitate replacing the spit plate 102. For this, the spittoon assembly 200 may include a mounting structure for mounting the split plate 102 in the spittoon assembly 200. The mounting structure may for example comprise a protrusion 206 to hold or support the spit plate 102. Additionally or alternatively, the mounting structure may comprise a clip, hook or screw for removably attaching the spit plate 102 to the spittoon assembly 200.

Figure 3A:
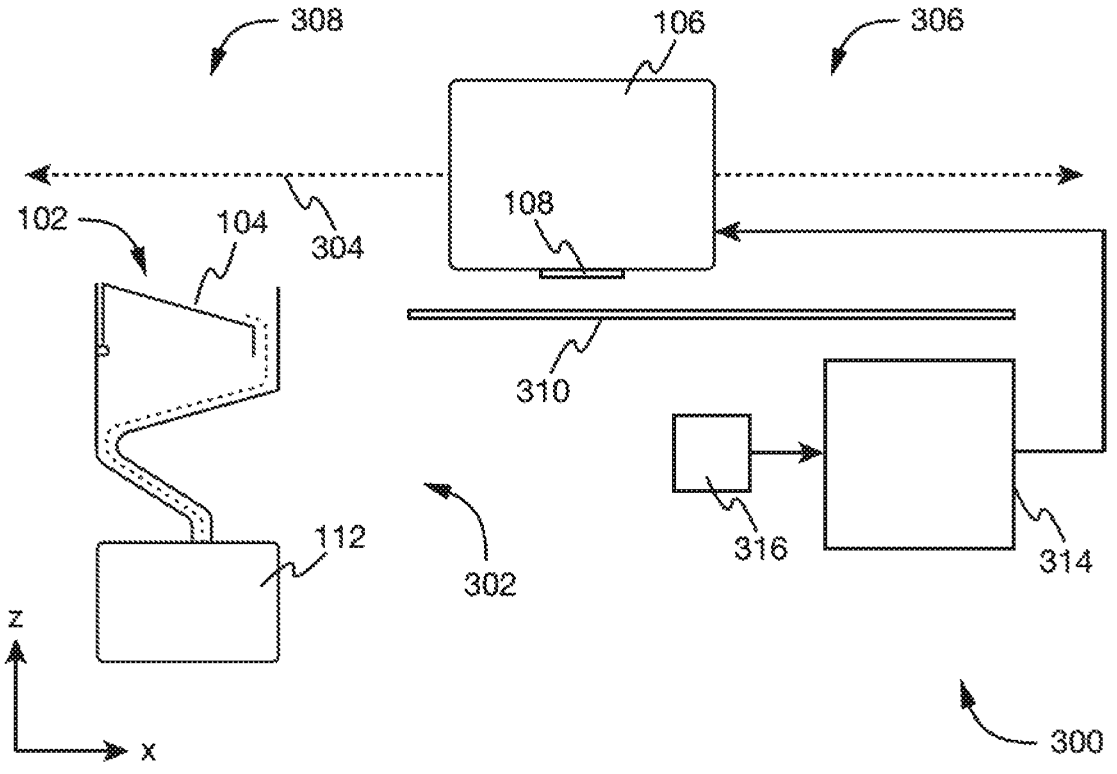
FIG. 3*a*: a front view of a printing device according to an example.
Figure 3B:
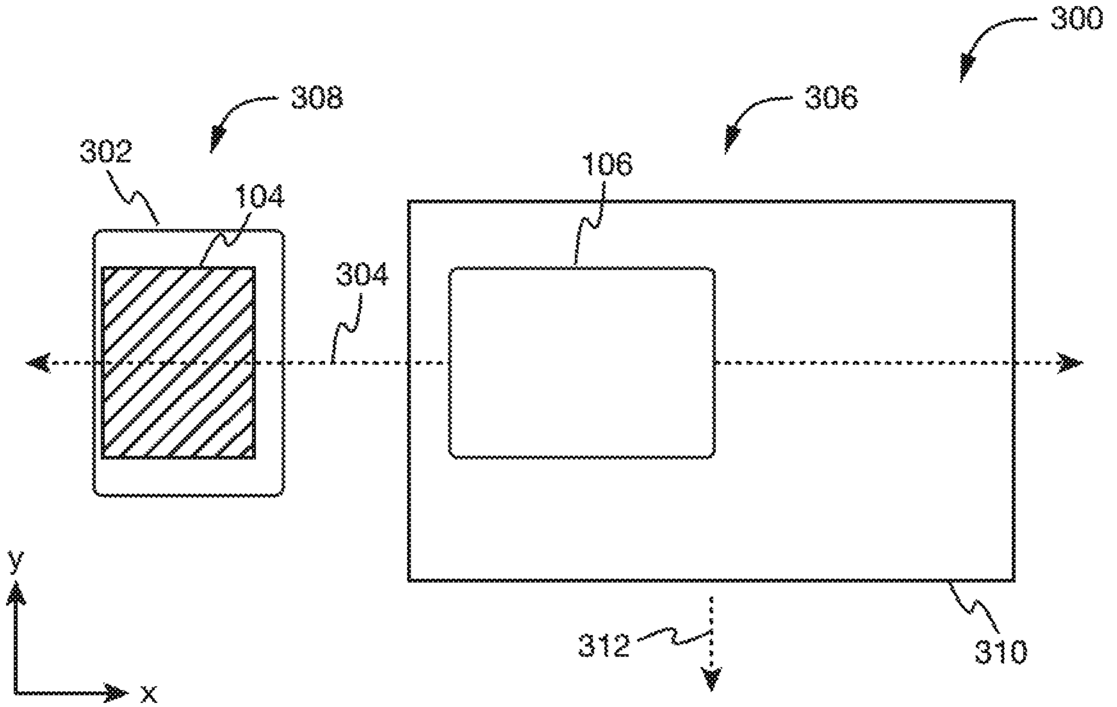
FIG. 3*b*: a top view of the printing device of FIG. 3*a;*

FIGS. 3*a* and 3*b* show schematic illustrations of a printing device 300 in accordance with an example. FIG. 3*a* depicts a front view of the printing device 300, e.g. along a horizontal Y axis, and FIG. 3*b* a top view of the printing device 300, e.g. in the vertical Z direction.

The printing device 300 comprises a print head 106 and a spittoon assembly 302 with a spit plate 102. The print head 106 is movable along a print head path 304 that extends from a printing zone 306 to a maintenance area 308. The print head path 304 may for example extend along a scanning direction aligned with the X axis. To move the print head 106, the printing device 300 may comprise an actuator like an electric motor, which may for example be coupled to a carriage carrying the print head 106 through a worm drive or a belt drive. In the printing zone 306, a print medium 310 may be arranged such that print fluid can be deposited on the print medium 310 by the print head 106. The print medium 310 may be movable along a media advance path 312 in a media advance direction, e.g. by another actuator, wherein the media advance direction may for example be aligned with the Y axis and may also be referred to as the Y direction in the following. When the printing device 300 is placed on a flat surface, the X axis and the Y axis may be in a horizontal plane perpendicular to the direction of gravity, i.e. such that the Z axis is perpendicular to X and Y axes.

The spittoon assembly 302 is arranged in the maintenance area 308, e.g. adjacent to a lateral border of the printing zone 306 and/or of the print medium 310. The spit plate 102 has a receiving surface 104 that is inclined relative to a horizontal direction by an inclination angle. The receiving surface 104 may for example be inclined along the X direction. In some examples, the spittoon assembly 302 may be similar to the spittoon assembly 100 or 200. When the print head 106 is in the maintenance area 308, a nozzle plate 108 of the print head 106 faces the receiving surface 104 of the spit plate 102, e.g. such that print fluid ejected from a nozzle arranged on the nozzle plate 108 may be ejected towards the receiving surface 104. In some examples, the printing device 300 may comprise a second spittoon assembly (not shown), which may for example be arranged on the opposite side of the printing zone 306 as the spittoon assembly 302. The second spittoon assembly may be similar to the spittoon assembly 302 and may for example allow for performing servicing of the print head 106 after each trip across the print medium 310.

The printing device 300 may further comprise a controller 314 that is to determine an amount of print fluid to be ejected from a nozzle of the print head 106 onto the receiving surface 104, e.g. during servicing of the print head 106. The controller 314 may in particular determine an amount of print fluid to be ejected for each of the nozzles of the print head 106. The controller 314 may be implemented in hardware, software or a combination thereof. The controller 314 may for example comprise a processor and a storage medium, wherein the storage medium contains a set of instructions to be executed by the processor in order to provide the functionality of the controller 314 described in the following, e.g. to execute one of the methods 600, 700, or 800 detailed below. The controller 314 may further control or perform other tasks associated with the servicing and/or operation of the print head 106. The controller 314 may for example control the ejection of print fluid from nozzles of the print head 106 for servicing and printing. The controller 314 may also control the movement of the print head 106 along the print head path 304. Furthermore, the controller 314 may determine that a servicing of the print head 106 is advisable and may initiate the servicing.

The controller 314 may determine the amount of print fluid to be ejected from a nozzle based on a flow parameter associated with a flow property of a fluid on the receiving surface 104. The amount of print fluid may for example be measured as a number of drops to be fired from the nozzle or a volume of print fluid to be ejected from the nozzle. The fluid may in particular be the print fluid or a reference fluid like water. The flow parameter may for example be a minimum amount of the fluid for the fluid to flow on the receiving surface 104 when the fluid is ejected onto a single point or a predefined area on the receiving surface 104. The flow parameter may e.g. have been determined empirically. In other examples, the flow parameter may be another parameter characterizing a flow property of the fluid that is obtained from the inclination angle, surface roughness or water contact angle of the receiving surface 104, a composition, density or viscosity of the print fluid or the minimum slope of the fluid path 114 or a combination thereof. In one example, the flow parameter may e.g. be the inclination angle, surface roughness or water contact angle of the receiving surface, a composition, density or viscosity of the print fluid or the minimum slope of the fluid path 114.

The controller 314 may further determine the amount of print fluid to be ejected from a nozzle based on a current and/or previous print job of the printing device, e.g. as detailed below with reference to FIGS. 7 and 8. The controller 314 may for example determine the amount of print fluid to be ejected from the nozzle based on an amount of print fluid that has passed through the nozzle since the last servicing.

The printing device 300 may further comprise an ambient condition sensor 316 that is to measure an ambient condition parameter, e.g. a temperature or humidity in the printing device or the vicinity of the printing device. The controller 314 may be coupled to the ambient condition sensor 316 and may determine the amount of print fluid to be ejected from a nozzle based on the ambient condition parameter measured by the ambient condition sensor 316, e.g. as detailed below with reference to FIGS. 7 and 8. In some examples, the printing device 300 may comprise multiple ambient condition sensors, for example a temperature sensor and a humidity sensor.

The controller 314 may also determine a firing rate $f_d$ for ejecting the print fluid from the nozzle based on the amount of print fluid. The firing rate $f_d$ characterizes an amount of print fluid ejected per unit of time and may for example be measured as a number of drops ejected from the nozzle per second. The print head 106 may e.g. be capable of firing drops of print fluid from the nozzle at a frequency of up to 10 kHz, i.e. 10,000 drops per second, in some examples of up to 20 kHz. The controller 314 may further determine the firing rate based on a length $d_p$ of the receiving surface 104 in the scanning direction and/or a velocity of the print head 106, e.g. as detailed below with reference to FIGS. 7 and 8. The controller 314 may further determine a firing position of the print head 106 for ejecting the print fluid from the nozzle of the print head. The controller 314 may in particular determine the firing position based on an amount of ink that has been ejected onto the receiving surface or a part thereof e.g. as described below with reference to FIG. 5.

As mentioned above, the controller 314 may also control the movement of the print head 106 and the ejection of print fluid from nozzles of the print head 106 during servicing. Accordingly, when initiating the servicing, the controller 314 may move the print head 106 to the maintenance area 308 such that the nozzle plate 108 faces the receiving surface 104, e.g. by moving the print head 106 to the firing position. Subsequently, the controller 314 may cause the print head 106 to eject the determined amount of print fluid from the nozzle, e.g. with the determined firing rate. In other examples, another controller may control the movement of the print head 106 and the ejection of print fluid from nozzles of the print head 106. In this case, the controller 314 may provide the determined amount of print fluid to be ejected, the firing rate and/or the firing position to the other controller.

Figure 4A:
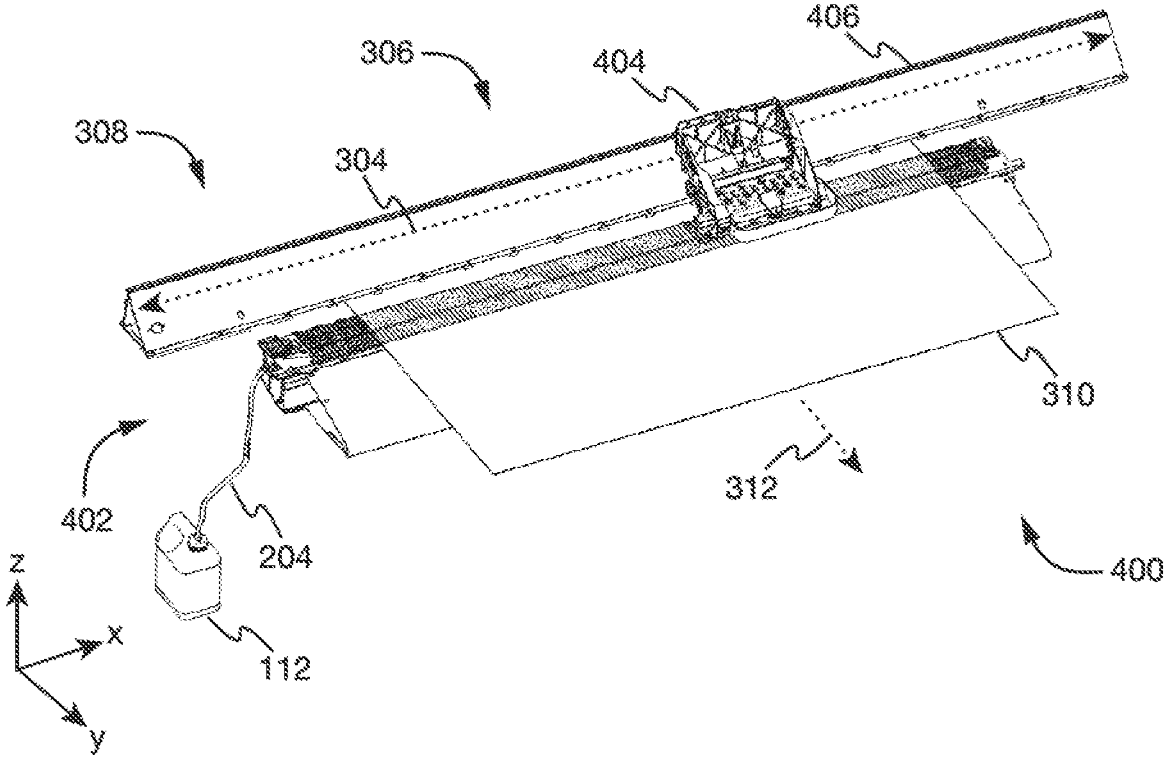
FIG. 4*a*: a perspective view of a printing device according to an example.
Figure 4B:
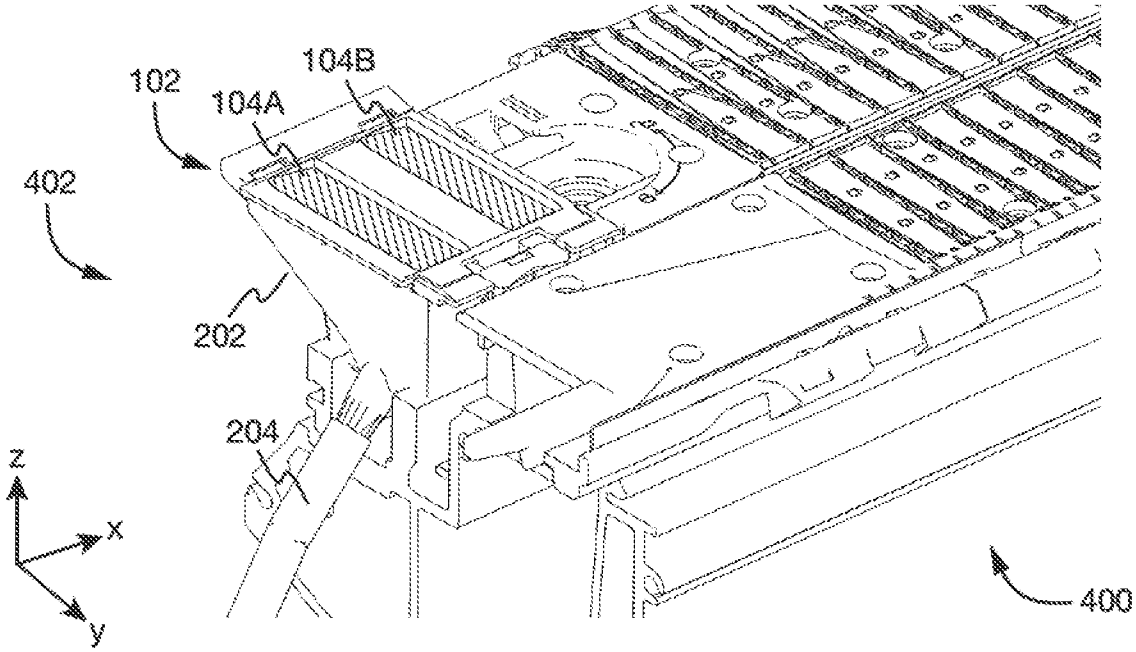
FIG. 4*b*: a perspective view of the spittoon assembly of the printing device of FIG. 4*a* in a mounted state.
Figure 4C:
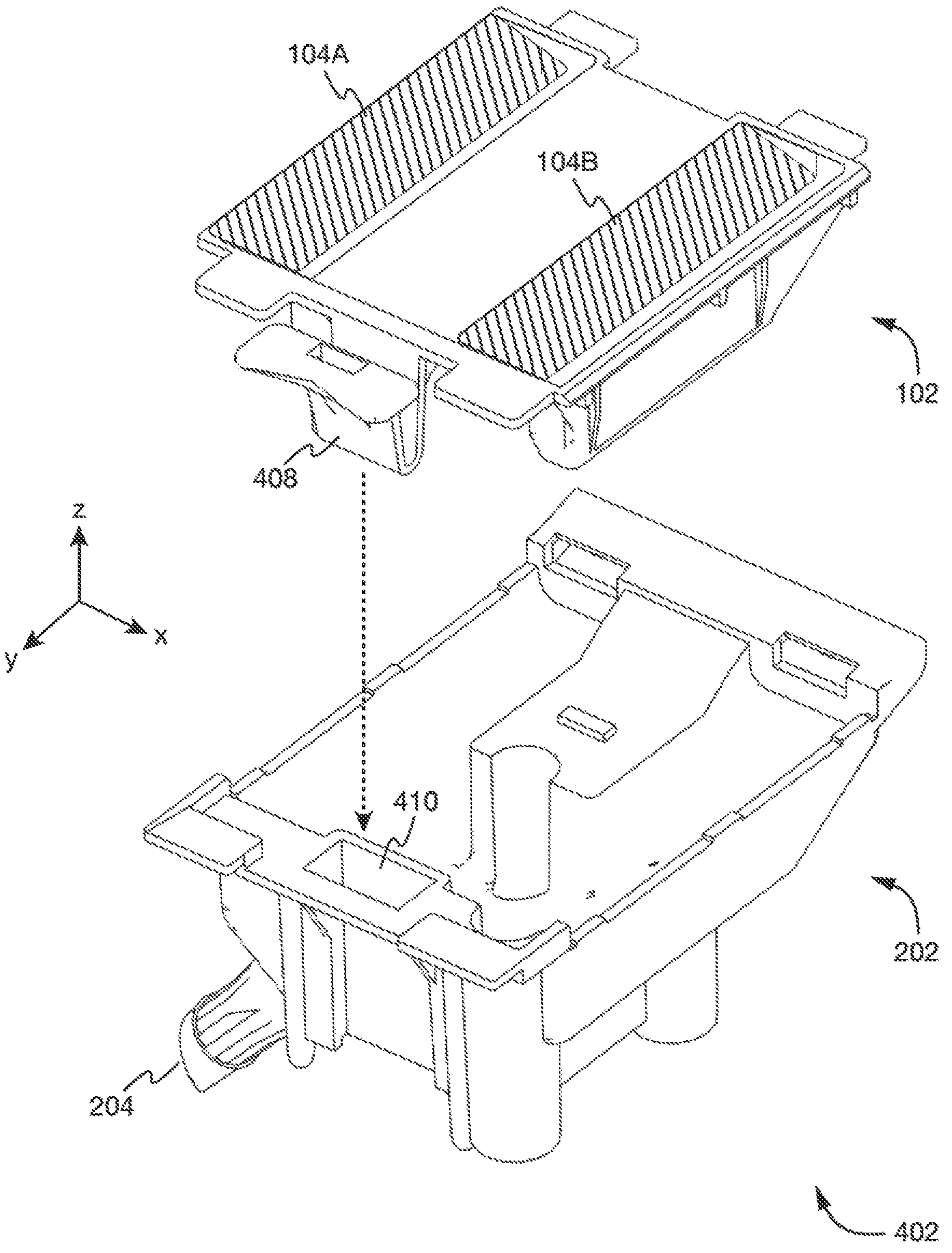
FIG. 4*c*: a perspective view of the spittoon assembly of the printing device of FIG. 4*a* in a disassembled state.

FIGS. 4*a*, 4*b* and 4*c* depict schematic illustrations of another printing device 400 in accordance with an example. FIG. 4*a* shows a perspective view of the printing device 400, FIG. 4*b* shows a perspective view of a spittoon assembly 402 of the printing device 400 in a mounted state and FIG. 4*c* shows a perspective view of the spittoon assembly 402 in a disassembled state.

The printing device 400 may be similar to the printing device 300. In particular, the printing device 400 comprises a print head (not shown) and the spittoon assembly 402. The print head 106 may be mounted on a carriage 404, which may slide along a rail 406 to move the print head 106 above the print medium 310 along the print head path 304. The printing device 400 may also comprise a controller (not shown) and an ambient condition sensor (not shown).

The spittoon assembly 402 may for example be similar to the spittoon assembly 200 and may also include a segmented spit plate 102 with a receiving surface 104 comprising two segments 104A and 104B. The segments 104A and 104B of the receiving surface 104 are inclined relative to a horizontal direction by an inclination angle, e.g. along the X axis. In other examples, the spittoon assembly 402 may comprise a spit plate 102 with a continuous receiving surface 104, e.g. similar to the spittoon assembly 100. The spittoon assembly 402 may further comprise a waste receptacle 112 that is connected to the spit plate 102 through a funnel 202 arranged underneath the spit plate 102 and a tube 204, which may be removably attached to the funnel 202 and the waste receptacle 112.

The spittoon assembly 402 is located in a maintenance area 308, which may e.g. be adjacent to a printing zone 306, in which the print medium 310 may be arranged. The spittoon assembly 402 may be arranged in the printing device 400 such that the spit plate 102 and/or the waste receptacle 112 are accessible to a user. This may allow for replacing the spit plate 102 and/or the waste receptacle 112, e.g. in case print fluid has accumulated on the receiving surface 104 or the waste receptacle 112 is full. To facilitate replacing the spit plate 102, the spit plate 102 may be removably attached to the funnel 202 via a mounting structure. In the example shown in FIG. 4*c*, the mounting structure comprises a clip 408 that is part of or connected to the spit plate 102 and configured to be inserted into a corresponding hole or cut-out of the funnel 202. The cut-out may for example be arranged on a top surface connected to a side wall of the funnel 202.

Figure 5:
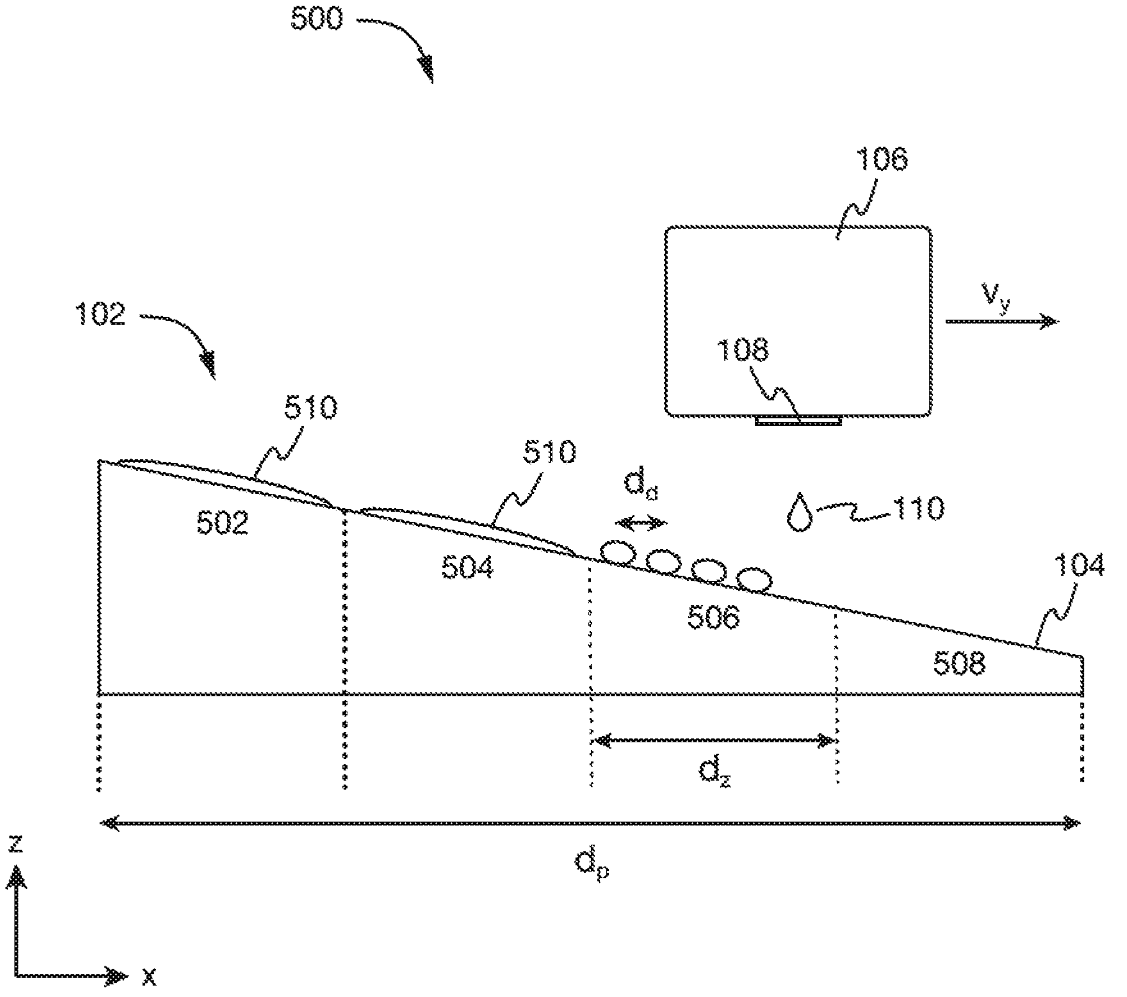
FIG. 5: a spittoon assembly with deposition zones according to an example.

FIG. 5 depicts another spittoon assembly 500 in accordance with an example. Similar to the spittoon assembly 100, the spittoon assembly 500 comprises a spit plate 102 with a receiving surface 104 that is inclined by an inclination angle relative to a horizontal direction when the spittoon assembly 500 is mounted in a printing device, e.g. the printing device 300 or 400. In addition, the spittoon assembly 500 may comprise a waste receptacle (not shown) with a fluid path (not shown) extending from the receiving surface 104 to the waste receptacle 112.

The receiving surface 104 may have a length $d_p$ along the scanning direction of a print head 106 of the printing device, wherein the length $d_p$ in the scanning direction refers to the length of the projection of the receiving surface 104 onto the scanning direction, i.e. the length as seen by the print head 106. The length $d_p$ may e.g. be between 3 mm and 15 mm, in one example 10 mm. The receiving surface 104 of the spittoon assembly 500 may comprise a plurality of deposition zones, e.g. four deposition zones 502, 504, 506, and 508. In other examples, the receiving surface 104 may comprise a different number of deposition zones, e.g. between 2 and 20 deposition zones. The deposition zones 502, 504, 506, and 508 may for example be predetermined portions of the receiving surface 104, which may e.g. be defined to evenly distribute print fluid ejected onto the receiving surface 104. Each of the deposition zones 502, 504, 506, and 508 may have a length of $d_z$ in the scanning direction, wherein the length $d_z$ in the scanning direction refers to the length of the projection of a deposition zone onto the scanning direction. The deposition zones 502, 504, 506, and 508 may be arranged adjacent to each other along the scanning direction as shown in FIG. 5. In some examples, the deposition zones 502, 504, 506, and 508 may overlap at least in part, e.g. an edge portion of one deposition zone may also be part of a neighboring deposition zone. The length $d_z$ of a deposition zone may e.g. be between 0.5 mm and 5 mm, in one example 2.5 mm.

The controller 314 may keep track of an amount of print fluid ejected onto the receiving surface or a part thereof such as one or more of the deposition zones 502, 504, 506, and 508. The controller 314 may for example keep track of the amount ejected since the last replacement of the spit plate 102. Based on this amount, the controller 314 may determine a firing position of the print head 106, at which the print fluid is to be ejected from the print head 106, e.g. as detailed below with reference to FIGS. 7 and 8. Over time, some print fluid 510 may accumulate on the receiving surface 104, e.g. due to an incomplete transfer of the ejected print fluid into the waste tank 112. By adjusting the firing position of the print head 106 based on the amount of ejected print fluid, the accumulated print fluid 510 may be evenly distributed over the receiving surface 104 and the lifetime of the spit plate 102 may be increased.

As described above, the controller 314 may also determine a firing rate $f_d$ at which drops 110 are fired from a nozzle of the print head 106. While firing, the print head 106 may be moved with a velocity $v_X$ along the print head path 304. The firing rate may determine a distance $d_d$ between adjacent drops along the scanning direction, wherein the distance $d_d$ is given by $v_X/f_d$. If a certain number of drops $N_d$ are to be fired from a nozzle, the drops may be distributed around the firing position over the distance that the print head 106 moves in the meantime, i.e. a distance $N_d\, d_d$ if $v_X$ and $f_d$ are constant. In this case, the firing position is defined as the average position of the $N_d$ drops. In some examples, the controller 314 may determine the firing rate $f_d$ and/or the firing position such that the drops are confined to the receiving surface, in particular to one of the deposition zones 502, 504, 506, and 508, e.g. as detailed below with reference to FIGS. 7 and 8. The centers of the deposition zones 502, 504, 506, and 508 may for example be used as available firing positions, from which the firing position is to be selected.

In the following, examples 600, 700, and 800 of methods of cleaning a print head using a spittoon assembly are described. The methods 600, 700, and 800 may be executed with a spittoon assembly comprising a spit plate with a receiving surface inclined relative to a horizontal direction by an inclination angle. The methods 600, 700, and 800 may for example be executed with one of the spittoon assemblies 100, 200, and 500 and/or one of the printing devices 300 and 400. The methods 600, 700, and 800 are described below with reference to FIGS. 1 to 5. This is, however, not intended to be limiting in any way and the methods 600, 700, and 800 may be executed with any other suitable spittoon assembly or printing device. Furthermore, the flow diagrams of FIGS. 6, 7, and 8 do not imply a certain order of execution of the method 600, 700, and 800, respectively. As far as technically feasible, the methods 600, 700, and 800 may be executed in any order. In particular, parts of the method 600, 700, and 800 may be executed simultaneously at least in part.

The methods 600, 700, and 800 may for example be executed after a print job of the print head 106 or during a print job, e.g. each time the print head 106 has passed the print medium 310 a predefined number of times or after a predefined service time interval. In one example, the methods 600, 700, and 800 may be executed each time the print head 106 reaches the maintenance area 308. The methods 600, 700, and 800 may be executed for a nozzle of the print head 106. In particular, the methods 600, 700, and 800 may be executed for each of the nozzles of the print head 106, e.g. separately for each of the nozzles or for groups of nozzles, for example as described below for method 600.

Figure 6:
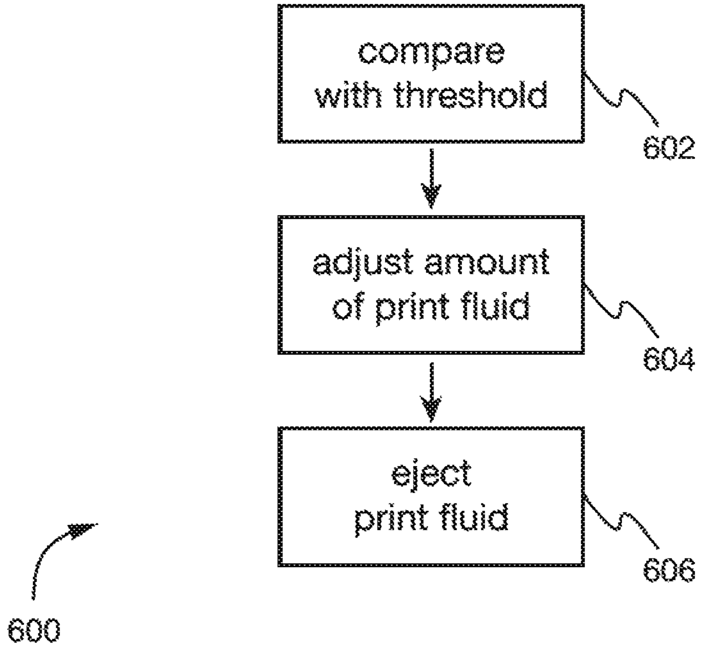
FIG. 6: a method of cleaning a print head using a spittoon assembly according to an example.

FIG. 6 shows a flow diagram of the method 600 of cleaning a print head using a spittoon assembly according to an example. The method 600 comprises, at block 602, comparing an initial value of an amount of print fluid to be ejected to a flow threshold of the receiving surface 104. The initial value may have been determined prior to execution of the method 600, e.g. as in block 702 of method 700 or block 802 of method 800 described below. The flow threshold of the receiving surface 104 characterizes a minimum amount of a fluid, e.g. the printing fluid or a reference fluid like water, for the fluid to flow on the receiving surface 104 when the fluid is ejected onto a single point or a predefined area on the receiving surface 104. The predefined area may e.g. extend over the length $d_z$ of one of the deposition zones 502, 504, 506, and 508 in the scanning direction or a fraction thereof. The flow threshold may for example have been determined empirically prior to execution of the method 600. In other examples, the flow threshold may have been determined based on the inclination angle, surface roughness or water contact angle of the receiving surface 104, a composition, density or viscosity of the print fluid, the minimum slope of the fluid path 114 or a combination thereof. In some examples, the flow threshold may additionally include a safety margin and may for example be between 125% and 200% of an empirically determined threshold.

The method 600 further comprises, at block 604, adjusting the amount of print fluid to be ejected if the initial value is below the flow threshold. In particular, the amount of print fluid to be ejected may be increased to an adjusted value equal to or above the flow threshold. In one example, the adjusted value may correspond to the flow threshold multiplied with a scaling factor, wherein the scaling factor may for example be between 100% and 150%. If the initial value is equal to or above the flow threshold, the method 600 may directly proceed from block 602 to block 606 without adjusting the amount of print fluid to be ejected in block 604.

The method 600 also comprises, at block 606, ejecting print fluid from a nozzle of the print head 106 onto the receiving surface 104. The amount of print fluid that is ejected corresponds to the initial value if the initial value is at or above the flow threshold and corresponds to the adjusted value if the initial value is below the flow threshold. The print fluid may for example be ejected by firing a number of drops from the nozzle that corresponds to the amount of print fluid to be ejected. The drops may be fired at a firing rate $f_d$, which may e.g. be between 1 kHz and 20 kHz. Block 606 may further comprise moving the print head 106 in the scanning direction while ejecting print fluid from the nozzle, e.g. with the velocity $v_X$. In some examples, the sign of the velocity $v_X$, i.e. the direction in which the print head 106 is moved, may be chosen such that the flow of the print fluid on the receiving surface 104 is facilitated. The print head 106 may for example be moved in the flow direction of the print fluid on the receiving surface 104, e.g. to the right as shown in FIG. 5, such that drops deposited first flow towards the position that later drops are deposited on.

As mentioned above, the method 600 may be executed for each of the nozzles of the print head 106, in particular simultaneously or simultaneously at least in part. In one example, the method 600 may be executed separately for each of the nozzles of the print head 106. In other examples, the method 600 may be executed for groups of nozzles or all of the nozzles, wherein the initial value may e.g. have been determined for the group of nozzles or may be a minimum, average or median initial value of the initial values of the nozzles from the groups of nozzles. In block 604, the amount of print fluid to be ejected may e.g. be increased by the same amount or the same factor for each nozzle in the group. In block 606, the print fluid may be ejected simultaneously from a group of nozzles or all of the nozzles of the print head 106 or may be ejected sequentially from different nozzles or different groups of nozzles.

Figure 7:
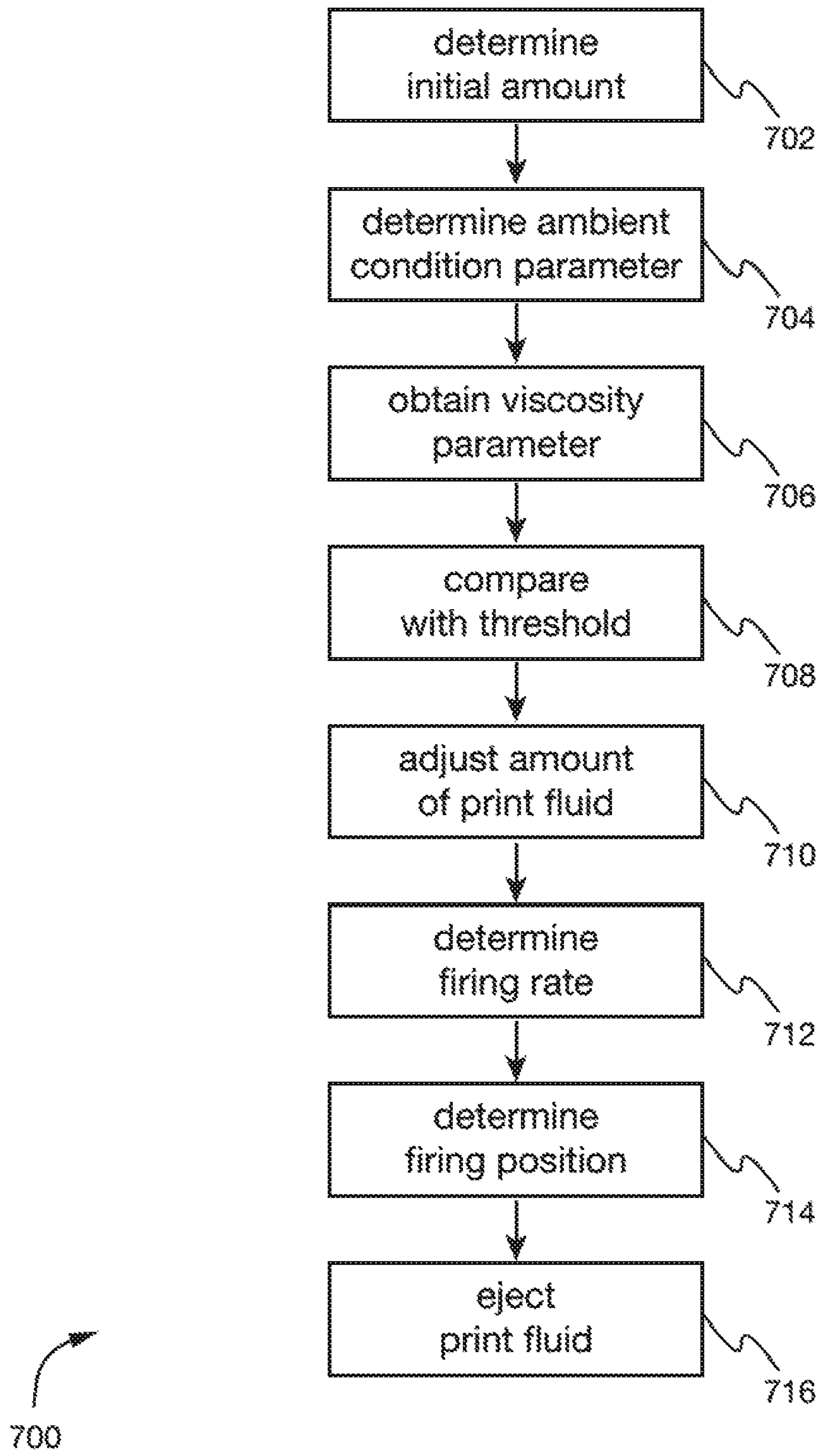
FIG. 7: another method of cleaning a print head using a spittoon assembly according to an example.

FIG. 7 depicts a flow diagram of the method 700 of cleaning a print head using a spittoon assembly in accordance with an example. The method 700 may comprise, at block 702, determining the initial value for the amount of print fluid to be ejected from the nozzle of the print head 106, e.g. a value that allows for maintaining the print quality and preventing the nozzle from clogging. The amount of print fluid to be ejected may for example be determined based on a current and/or previous print job of the printing device. In one example, an amount of print fluid that has passed through the nozzle since the last servicing may be obtained. The amount of print fluid to be ejected from the nozzle may be determined based on the amount of print fluid that has passed through the nozzle since the last servicing. The amount of print fluid to be ejected may for example be higher if the amount of print fluid that has passed through the print nozzle is smaller, e.g. to prevent clogging of rarely used nozzles. In addition, properties of the print fluid may be taken into account when determining the initial value, for example a viscosity of the print fluid or an evaporation rate, e.g. to assess the risk of clogging.

The method 700 may further comprise, at block 704, determining an ambient condition parameter, e.g. using the ambient condition sensor 316. The ambient condition parameter may for example be a temperature or humidity, in particular a relative humidity. A change in temperature or humidity may alter the flow properties of the print fluid on the receiving surface 104. Block 704 may also comprise determining multiple ambient condition parameters, e.g. a temperature and humidity. The ambient condition parameter may be determined at a single point in time or may be tracked over time, e.g. to determine the average of the ambient condition parameter in a predefined time interval, e.g. the time since the last execution of method 700 or over the last 15 min to 120 min, or a change of the ambient condition. In some examples, an ambient condition parameter determined in block 704 may be used to determine servicing requirements for the print head 106, e.g. to determine the initial value for the amount of print fluid to be ejected in block 706 or to determine how often the method 700 is to be executed. In one example, the initial value for the amount of print fluid to be ejected may be increased at a higher temperature or lower humidity, e.g. similar as in block 710 described below. Alternatively or additionally, the method 700 may be executed more frequently at a higher temperature or lower humidity.

The method 700 may also comprise, at block 706, obtaining a viscosity parameter that characterizes a viscosity of the print fluid. The viscosity of the print fluid may affect the flow properties of the print fluid on the receiving surface 104. The viscosity parameter may for example be obtained by determining a type of print fluid in the print head 106, e.g. from an identifier chip of a cartridge installed in the print head 106, and obtaining the viscosity parameter associated with the type of print fluid from a lookup table, which may e.g. be stored on the controller 314. The type of print fluid may for example characterize a composition and/or color of the print fluid. In other examples, the viscosity parameter or the type of print fluid may be provided by a computing device connected to the printing device, e.g. by a user selecting the type of print fluid in the print head 106. Block 706 may further comprise obtaining an evaporation parameter that characterizes an evaporation rate of the print fluid, which may also affect the flow properties of the print fluid on the receiving surface 104.

The method 700 further comprises, at block 708, comparing the initial value of the amount of print fluid to be ejected to the flow threshold of the receiving surface 104 similar to block 602. In some examples, block 708 may comprise adjusting the flow threshold of the receiving surface 104 based on the ambient condition parameter determined in block 704 and/or the viscosity parameter, evaporation parameter and/or type of print fluid obtained in block 706, e.g. to adjust the amount of print fluid to be ejected based on the ambient condition parameter and/or the viscosity parameter. For example, the flow threshold may be increased for larger values of the temperature, viscosity or evaporation rate or for lower values of the humidity. Thereby, the method 700 may ensure that the amount of print fluid ejected on the receiving surface 104 is sufficient to facilitate a flow of the ejected print fluid on the receiving surface 104 under the current ambient conditions and for the respective print fluid.

The method 700 may further comprise, at block 710, adjusting the amount of print fluid to be ejected. The amount of print fluid to be ejected may for example be adjusted as in block 604 depending on whether the initial amount determined in block 702 exceeds the flow threshold in the comparison in block 704. Additionally, further adjustments of the amount of print fluid to be ejected may be made subsequently, e.g. based on the ambient condition parameter determined in block 704 and/or the viscosity parameter, evaporation rate and/or type of print fluid obtained in block 706. For example, the amount of print fluid to be ejected may be increased further for larger values of the temperature, viscosity or evaporation rate or for lower values of the humidity. The amount of print fluid to be ejected may for example be scaled with a scaling factor that depends on the respective parameter, e.g. through a predefined functional dependence, which may for example have been determined empirically prior to execution of 700. In one example, the scaling factor may be $1+c_T(T-T_0)$ at a temperature T, wherein $c_T$ is a predefined numerical prefactor and $T_0$ a predefined reference temperature. Similar scaling factors may e.g. be used for the other parameters. In other examples, the amount of print fluid to be ejected may be adjusted if the respective parameter is above or below a predefined threshold, e.g. as detailed below with reference to method 800.

The method 700 may also comprise, at block 712, determining the firing rate $f_D$ for ejecting the print fluid from the nozzle of the print head. The firing rate $f_D$ characterizes an amount of print fluid ejected per unit of time, for example a frequency at which drops of print fluid are fired from the nozzle. The firing rate may be determined based on the amount of print fluid to be ejected and the length $d_p$ of the receiving surface 104 in the scanning direction. The firing rate may for example be increased for a larger amount of print fluid to be ejected and/or a smaller length $d_p$ of the receiving surface 104. In particular, the firing rate may be chosen such that the length over which the ejected print fluid is deposited on the receiving surface 104 is smaller than the length $d_p$ of the receiving surface 104 or the length $d_z$ of one of the deposition zones 502, 504, 506, and 508 on the receiving surface 104 in the scanning direction. In addition, the flow threshold, inclination angle, surface roughness or water contact angle of the receiving surface 104, a composition, density or viscosity of the print fluid or a combination thereof may be taken into account for determining the firing rate. For example, the firing rate may be increased for a lower flow threshold, a smaller inclination angle, a larger surface roughness, a smaller water contact angle or a larger viscosity of the print fluid, e.g. to deposit the ejected print fluid onto a smaller area and thereby facilitate the flow of ejected print fluid on the receiving surface 104. Block 712 may further comprise determining the velocity $v_X$ of the print head 106 when ejecting the print fluid in block 716. In one example, the velocity $v_X$ may be reduced when the firing rate reaches a maximum firing rate of the print head 106. In some examples, block 712 may further comprise redefining deposition zones on the receiving surface 104, e.g. reducing the number of deposition zones to increase the length of a deposition zone in the scanning direction when the firing rate reaches a maximum firing rate of the print head 106.

The method 700 may further comprise, at block 714, determining the firing position of the print head 106 for ejecting the print fluid from the nozzle of print head 106 in block 716. For this, an amount of ink ejected onto a current firing position may be obtained, e.g. from the controller 314, which may log the amount of ink ejected onto different positions on the receiving surface 104. Alternatively, the number of times that the current firing position has been used as a firing position may be obtained as a measure for the amount of ink ejected onto the current firing position. Depending on the amount of ink ejected onto the current firing position, the firing position may be maintained at the current firing position or may be adjusted to a new firing position different from the current firing position. In some examples, possible firing positions may correspond to positions in the deposition zones 502, 504, 506, and 508, e.g. the centers of the deposition zones 502, 504, 506, and 508. The amount of ink ejected onto a current firing position, which may e.g. correspond to a current deposition zone, i.e. lie within the current deposition zone, may for example be compared to a capacity threshold, e.g. as detailed below with reference to method 800. If the amount of ink ejected under the current firing position exceeds the capacity threshold, the current firing position may be changed to a new firing position, e.g. in another deposition zone. In other examples, the firing position may always be set to the firing position that has received the smallest amount of ink.

In some examples, the firing position may be determined using a predefined firing position sequence that comprises a sequence of firing positions that are to be used sequentially, e.g. when executing method 700 multiple times. For example, whenever the current firing position has reached the capacity threshold, the current firing position may be changed to the next firing position in the firing position sequence. In one example, the firing position sequence may comprise the available firing position on the receiving surface 104 in descending order, i.e. the uppermost firing position, e.g. in deposition zone 502, may be used first and the lowest firing position, e.g. in deposition zone 508, may be used last. This may facilitate the flow of the print medium on the receiving surface 104 since the print fluid 510 accumulated on the receiving surface 104 may increase the slope of the receiving surface 104. In another example, the firing position sequence may comprise the available firing position on the receiving surface 104 first in descending order and subsequently in ascending order, i.e. the firing position may first be moved downwards on the receiving surface 104 starting from the uppermost firing position and after reaching the lowest firing position may be moved upwards again.

At block 716, the amount of print fluid determined in blocks 702 to 710 is ejected from the nozzle of the print head 106 onto the receiving surface 104, e.g. similar to block 606 of method 600. Block 716 may comprise moving the print head 106 to the firing position determined in block 714 and may comprise moving the print head 106 with the velocity $v_X$ while ejecting print fluid. The print fluid may for example be ejected by firing a number of drops from the nozzle that corresponds to the amount of print fluid to be ejected that was determined in block 702 to 710. The drops may be fired at the firing rate $f_d$ determined in block 712.

Figure 8:
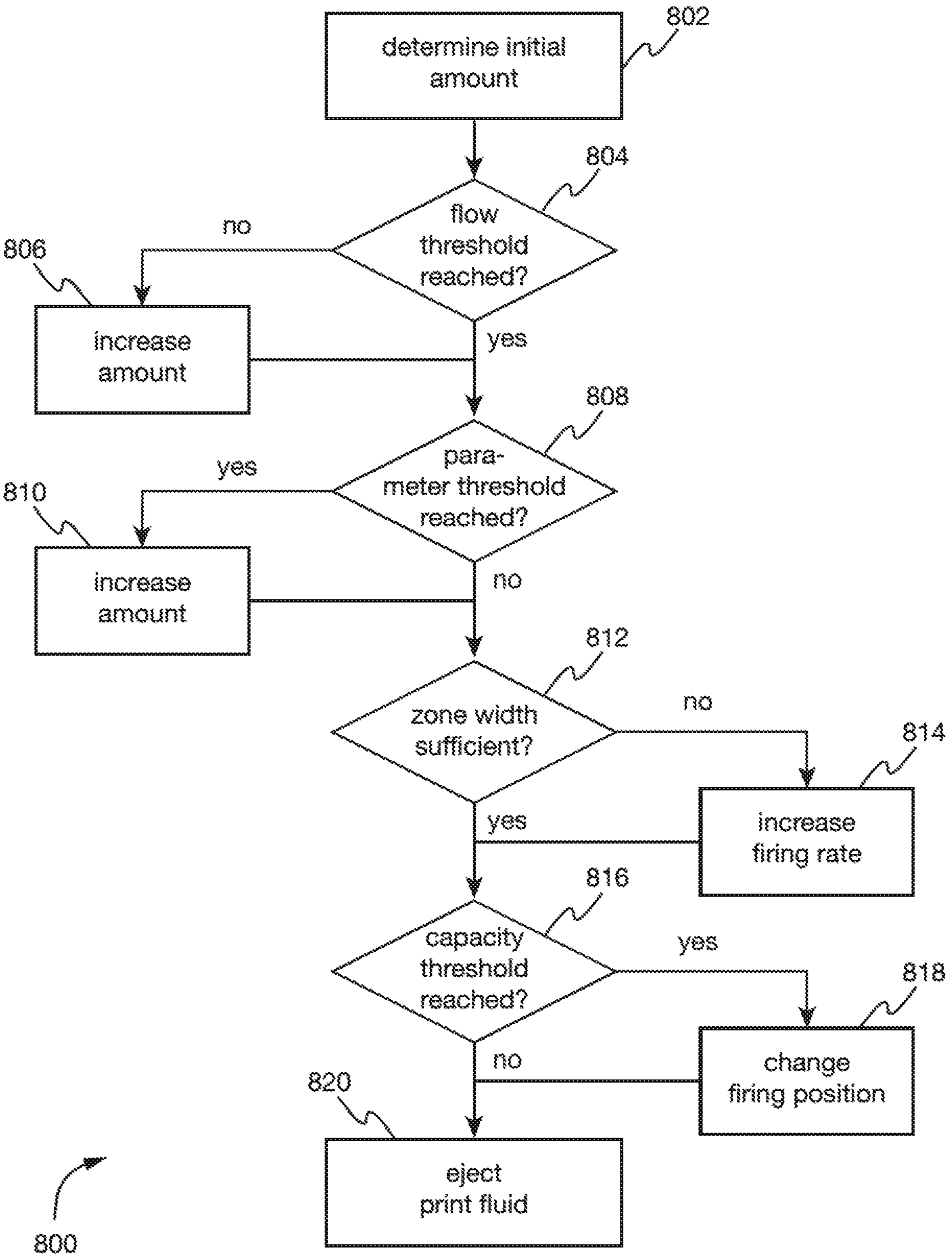
FIG. 8: a further method of cleaning a print head using a spittoon assembly according to an example.

FIG. 8 depicts a flow diagram of the method 800 of cleaning a print head using a spittoon assembly in accordance with an example. The method 800 may comprise, at block 802, determining the initial value for the amount of print fluid to be ejected from the nozzle of the print head 106, e.g. as in block 702 of method 700. In one example, an initial value of 5 drops of print fluid may be determined based on the amount of print fluid that has passed through the nozzle since the last execution of method 800, wherein the initial value may be chosen so as to maintain the print quality, e.g. based on empirical data.

The method 800 further comprises, at block 804, comparing the initial value of the amount of print fluid to be ejected to the flow threshold of the receiving sample, e.g. similar to block 708. In the above example, the flow threshold may be 8 drops of print fluid, wherein the flow threshold may e.g. a predetermined value that has been determined empirically for the spit plate 102 and the type of ink used for the nozzle. If the initial value is equal to or above the flow threshold, the method 800 may proceed to block 808. Otherwise, as in the above example, in which the initial value is 5 drops, the method may proceed to block 806. At block 806, the amount of print fluid to be ejected is increased to an adjusted value equal to or above the flow threshold. In the example, the number of drops may thus e.g. be increased to the flow threshold, i.e. 8 drops of print fluid.

At block 808, the method 800 may comprise determining an ambient condition parameter, e.g. a temperature or humidity. The ambient condition parameter may be compared to a threshold for the ambient condition parameter. If the parameter threshold is reached, the method 800 may proceed to block 810. Otherwise the method may proceed to block 812. Depending on the ambient condition parameter, the parameter threshold may be reached if the value of the ambient condition parameter is larger than the threshold or if the value of the ambient condition parameter is smaller than the threshold. In block 810, the value for the amount of print fluid to be ejected may be increased, e.g. by a certain amount or factor. The method 800 may also comprise executing blocks 808 and/or 810 multiple times using different ambient threshold parameters. Alternatively, block 808 may also comprise comparing multiple ambient condition parameters with the respective threshold and, in block 810, the amount of print fluid to be ejected may be adjusted based on the number of parameters that have reached the respective threshold.

In the above example, the temperature and the relative humidity in the vicinity of the spit plate 102 may be measured and compared to the corresponding parameter threshold. The parameter threshold for the temperature may e.g. be defined as 30° C., wherein the threshold is reached if the measured temperature is larger than 30° C. The parameter threshold for the relative humidity may e.g. be defined as 50%, wherein the threshold is reached if the measured humidity is smaller than 50%. The measured temperature may e.g. be 35° C. and the measured relative humidity 40%, i.e. both values may have reached the respective threshold. The method 800 may thus proceed to block 810. In block 810, the amount of print fluid may e.g. be increased by 25% if one of the thresholds is reached and by 50% if both thresholds are reached. Accordingly, the amount of print fluid to be ejected may be increased to 12 drops.

The method 800 may further comprise, at block 812, determining whether the available space on the spit plate 102 is sufficient for the amount of print fluid determined in blocks 802 to 810, e.g. based on the current firing position, firing rate $f_d$ and print head velocity $v_X$. Block 812 may e.g. comprise determining whether the width $d_z$ of a deposition zone, e.g. the deposition zone 506, is large enough such all drops can be deposited onto the deposition zone. If it is determined that the available space is not sufficient, the method 800 may proceed to block 814 to adjust the firing rate, print head velocity and/or deposition zones. Otherwise, the method 800 may proceed to block 816. At block 814, the firing rate may be increased and/or the print head velocity may be reduced such that the available space is sufficient. Alternatively or additionally, the deposition zones may be redefined, e.g. to increase the length of the deposition zones in the scanning direction by reducing the number of deposition zones.

In the above example, the spit plate may e.g. have a length of $d_p$=10 mm in the scanning direction and may comprise the four deposition zones 502, 504, 506, and 508, each of which may have a length of $d_z$=2.5 mm in the scanning direction. The firing rate $f_d$ may e.g. be $f_d$=2 kHz, i.e. 2000 drops per second and the print head velocity may e.g. be $v_X$=1 m/s. Accordingly, the length for ejecting the 12 drops may e.g. be 6 mm, i.e. may be larger than the length of a deposition zone. In block 814, the firing rate may be adjusted such that the length for ejecting the 12 drops is smaller than the length of a deposition zone, e.g. by increasing the firing rate to 6 kHz. If the firing rate reaches a maximum firing rate of the print head 106, which may e.g. be between 10 kHz and 20 kHz, the print head velocity may be reduced. In other examples, the deposition zones may be redefined to reduce the number of deposition and thereby increase the length of a deposition zone, e.g. using three deposition zones instead of four.

The method 800 may also comprise, at block 816, determining whether the amount of ink ejected onto the current firing position exceeds the capacity threshold of the current firing position. The capacity threshold may be a fixed value, e.g. a certain number of drops such as 10,000 or 20,000 drops per position. Alternatively, the capacity threshold may depend on the distribution of the amount of ink ejected on the receiving surface 104. The capacity threshold may for example depend on the minimum or maximum amount of ink ejected onto any of the position on the receiving surface 104. The capacity threshold may e.g. be the maximum number of drops ejected onto any of the position on the receiving surface 104 or may e.g. be 5,000 drops more the minimum number of drops ejected onto any of the position on the receiving surface 104. In some examples, the capacity threshold may be adjusted in steps. The capacity threshold may e.g. first be 5,000 drops per position and, whenever every available firing position has reached the capacity threshold, the capacity threshold may be increased by 5,000 drops for each firing position. If the amount of ink ejected onto the current firing position exceeds the capacity threshold of the current firing position, the method 800 may proceed to block 818 to change the current firing position to a new firing position different from the current firing position, e.g. similar to block 714 of method 700. Otherwise, the method 800 may proceed to block 820 to eject the print fluid from the nozzle.

At block 820, the method comprises ejecting the amount of print fluid to be ejected from the nozzle of the print head 106 onto the receiving surface 104, e.g. similar to block 716 of method 700. In particular, the amount of print fluid determined in block 802 to 810 may be ejected from the nozzle using the firing rate and/or print head velocity determined in block 812 and 814 and the current firing position determined in blocks 816 and 818.

In the above example, the available firing position may e.g. correspond to centers of the deposition zones 502, 504, 506, and 508 and the capacity threshold may e.g. be 10,000 drops per deposition zone. The deposition zones 502 and 504 may have reached the capacity threshold and the current firing position may be in the deposition zone 506. The amount of ink ejected onto deposition zone 506 so far may e.g. be 4,000 drops, i.e. deposition zone 506 may still have capacity for 6,000 drops corresponding to 500 times firing 12 drops before reaching the capacity threshold. The method 800 may thus proceed to block 820 to eject the print fluid from the nozzle, i.e. 12 drops onto the deposition zone 506 with a firing rate of 6 kHz and a print head velocity of 1 m/s.

The method 800 may be executed repeatedly, e.g. whenever the print head 106 reaches the maintenance area 308. Assuming that the print job and the ambient conditions remain the same, the amount of print fluid to be ejected determined in block 802 to 810 may be 12 drops in each execution. Accordingly, the current firing position may be used for 500 executions of the method 800. When executing method 800 for the 501$^{st}$ time, deposition zone 506 may have reached the capacity threshold and method 800 may proceed to 818 to change the current firing position, e.g. using a predefined firing position sequence. The predefined firing position sequence may e.g. specify that the deposition zones 502, 504, 506, and 508 are to be selected sequentially from the top to the bottom, i.e. from deposition zone 502 to deposition zone 508. Accordingly, the current firing position may be changed to the center of deposition zone 508 in block 818 once deposition zone 506 has reached the capacity threshold.

This description is not intended to be exhaustive or limiting to any of the examples described above. The spittoon assembly, the printing device, and the method of cleaning a print head disclosed herein can be implemented in various ways and with many modifications without altering the underlying basic properties.

The invention claimed is:

1. A printing device comprising a print head and a spittoon assembly with a spit plate, wherein:

the print head is movable along a print head path extending from a printing zone to a maintenance area including the spittoon assembly;

a receiving surface of the spit plate faces a nozzle plate of the print head when the print head is in the maintenance area; and the receiving surface of the spit plate is inclined relative to a horizontal direction by an inclination angle, and wherein the spit plate is removably attached to the spittoon assembly.

2. The printing device of claim 1, further comprising a controller that is to determine an amount of print fluid to be ejected from a nozzle of the print head onto the receiving surface based on a flow parameter associated with a flow property of a fluid on the receiving surface.

3. The printing device of claim 2, further comprising an ambient condition sensor, wherein the controller is to determine the amount of print fluid to be ejected based on an ambient condition parameter measured by the ambient condition sensor.

4. The printing device of claim 2, wherein the controller is to determine a firing rate for ejecting the print fluid based on the amount of print fluid, wherein the firing rate characterizes an amount of print fluid ejected per unit of time.

5. The printing device of claim 2, wherein the controller is to determine a firing position of the print head for ejecting the print fluid based on an amount of ink that has been ejected onto the receiving surface or a part thereof.

* * * * *